US009275527B2

(12) United States Patent
Tupa et al.

(10) Patent No.: US 9,275,527 B2
(45) Date of Patent: *Mar. 1, 2016

(54) CONTROLLER

(71) Applicant: HEWLETT-PACKARD DEVELOPMENT COMPANY, L.P., Houston, TX (US)

(72) Inventors: Mark D. Tupa, Cypress, TX (US); Michael R. Durham, Tomball, TX (US); Christopher Rijken, Houston, TX (US); Louis B. Hobson, Tomball, TX (US); Joshua N. McMahon, Spring, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/499,394

(22) Filed: Sep. 29, 2014

(65) Prior Publication Data
US 2015/0015408 A1 Jan. 15, 2015

Related U.S. Application Data

(63) Continuation of application No. 12/574,472, filed on Oct. 6, 2009, now Pat. No. 8,886,974.

(51) Int. Cl.
G06F 1/32 (2006.01)
G08B 3/10 (2006.01)
G06F 21/81 (2013.01)

(52) U.S. Cl.
CPC ............... *G08B 3/10* (2013.01); *G06F 1/3203* (2013.01); *G06F 1/3206* (2013.01); *G06F 21/81* (2013.01)

(58) Field of Classification Search
None
See application file for complete search history.

(56) References Cited

U.S. PATENT DOCUMENTS

| 5,838,983 | A | 11/1998 | Atkinson |
| 6,775,784 | B1 | 8/2004 | Park |
| 7,114,090 | B2 | 9/2006 | Kardach et al. |
| 7,310,535 | B1 | 12/2007 | MacKenzie et al. |
| 8,886,974 | B2 * | 11/2014 | Tupa et al. ............... 713/320 |
| 2002/0195998 | A1 | 12/2002 | Yu |
| 2006/0038506 | A1 | 2/2006 | Rose et al. |
| 2006/0253628 | A1 | 11/2006 | Chan et al. |
| 2006/0284787 | A1 * | 12/2006 | Bear .................... G06Q 10/107 345/1.1 |
| 2007/0239921 | A1 | 10/2007 | Toorians et al. |
| 2008/0091962 | A1 | 4/2008 | Cepulis et al. |
| 2010/0164736 | A1 | 7/2010 | Byers et al. |
| 2010/0223484 | A1 | 9/2010 | Bold et al. |

OTHER PUBLICATIONS

HPDC, Final Office Action dated Jan. 15, 2013, U.S. Appl. No. 12/574,472, filed Oct. 6, 2009.
HPDC, Final Office Action dated Apr. 17, 2014, U.S. Appl. No. 12/574,472, filed Oct. 6, 2009.

(Continued)

*Primary Examiner* — Paul Yanchus, III
(74) *Attorney, Agent, or Firm* — HP Inc Patent Department

(57) ABSTRACT

A first controller can provide system state information and a second controller can receive the system state information. The second controller can be programmed to control the state of a component. The state of the component can be based on information programmed in the second controller and the system state information. The component can include an off state and an operating state indicated by a signal from the second controller.

13 Claims, 4 Drawing Sheets

(56) References Cited

OTHER PUBLICATIONS

HPDC, Notice of Allowance dated Jul. 16, 2014, U.S. Appl. No. 12/574,472, filed Oct. 6, 2009.

HPDC, Office Action dated Jan. 20, 2012, U.S. Appl. No. 12/574,472, filed Oct. 6, 2009.

HPDC, Office Action dated Jul. 16, 2012, U.S. Appl. No. 12/574,472, filed Oct. 6, 2009.

HPDC, Office Action dated Oct. 7, 2013, U.S. Appl. No. 12/574,472, filed Oct. 6, 2009.

* cited by examiner

CONTROLLER

CROSS-REFERENCE TO RELATED APPLICATION

This application claims priority to, and is a continuation application of U.S. patent application Ser. No. 12/574,472, filed Oct. 6, 2009, titled "Controller," the disclosure of which is hereby incorporated herein by reference.

BACKGROUND

The Advanced Configuration and Power Interface (ACPI) specification is an open standard for power management. The ACPI specification defines system states and component states for a computing system. The system states in ACPI are G0 (S0) operating, G1 Sleeping, which can be divided into sleep system states S1 through S4, G2 (S5) Soft Off and G3 Mechanical off. In G2 some components can remain powered so the computing system can go to G0 from an input of the power button, modem, LAN, or real time clock (RTC) alarm.

BRIEF DESCRIPTION OF THE DRAWINGS

For a detailed description of various examples, reference will now be made to the accompanying drawings in which.

DETAILED DESCRIPTION

Figure 1:
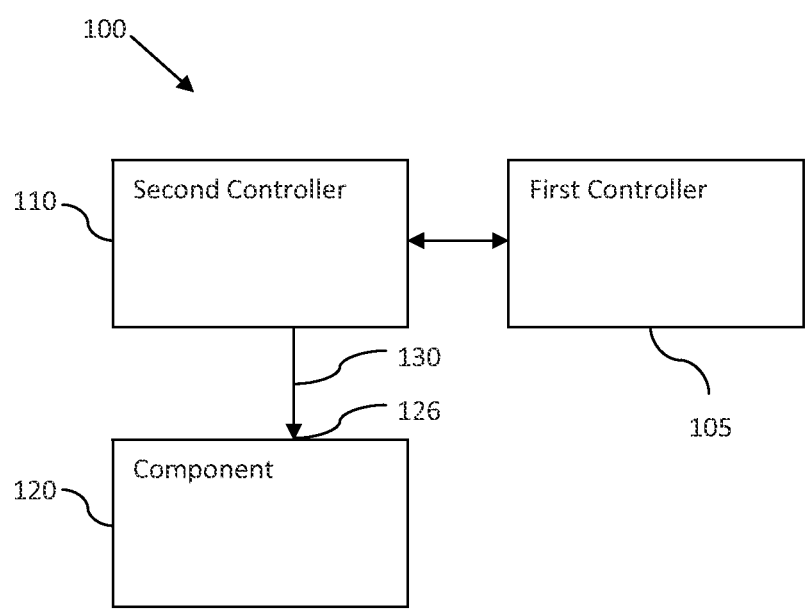
FIG. 1 is a block diagram according to an exemplary embodiment of the invention.

The ACPI specification defines system states and component states. In a system state there may be components that are powered when the component may not have a function in that system state. For example, one factor that may determine if a component is powered during a particular system state is the time it takes for the component to transition from an off state to an operating state. A specification may state that the basic input output system (BIOS) finishes a configuration of a component in a specified time. There also may be diagnostics that are performed in a system state and the user may not be notified of error conditions until a component finishes transitioning from an off state to an operating state.

Computing systems with ACPI can provide operating system directed configuration and power management (OSPM) which can include control over the power management and motherboard component configuration functions of a computing system. The OSPM can be responsible for handling motherboard component configuration events as well as for controlling the power, performance, and thermal status of the computing system based on user preference, application requests and operating system (OS) imposed Quality of Service (QOS) and usability goals. If an ACPI compliant computing system is in ACPI mode, the platform's hardware, firmware, and other software can manipulate the platform's configuration, power, performance, or thermal control interfaces with the OSPM in one embodiment.

The OSPM may control the power states of components if the operating system is in control of the hardware but in a system sleep state the processor or another component may not be active and thus the operating system that depends on the processor to execute code cannot control the power state of components while in a system sleep state. The system sleep state can be a system state where the processor does not execute instructions but the system can still become operational in response to an input from a component. For example if the computing system implements ACPI the system sleep state is G1 sleeping or G2 soft off. In one embodiment, the power state of the component can be managed outside of the OSPM to allow the power state of the component to be managed while the system is not in an operating state.

To reduce the power consumption of a computing system a component may be put in an off state if that component is not being actively used in the system state. For example, if in a system state a controller continues to perform diagnostics on the computing system in a sleep system state, the sleep system state may have the audio amplifier powered by an auxiliary power bus so that the audio amplifier can indicate the error. In another example, a temperature sensor may be powered if a system is in a sleep system state and the time that it takes to configure the temperature sensor is not within the time allowed to make the transition from the sleep system state to another system state such as the operating system state.

A computing system may include a main power well and an auxiliary power well. A power well supplies power from the power supply to a component. The auxiliary power well can supply power to components that are not turned off in at least one system state when the main power well does not supply power in that power state. A controller can be used to put the component receiving power from the auxiliary power well in an off state if the computing system is in a system state where the auxiliary power well is supplying power to the component. In the off state a component uses less power than a component in an operational state and a component is not responsive to a data bus.

A computing system can reduce the power consumption that occurs in the sleep state by putting the components in an off state while maintaining the ability to determine whether a component retains auxiliary power. For example, the controller can allow for audible diagnostic codes to occur while still supporting an off state and an operating state for the audio amplifier. In another example, the controller can configure the temperature monitoring component to reduce the resume times and allow the temperature monitoring component to be powered off during sleep states to minimizing sleep state power consumption. In another example, the controller can shutdown a component supplying power to an expansion connector. If a computing system is trying to achieve a lower power usage than is available when a component is powered from the auxiliary power well, the component may be powered off to achieve a lower power usage than if the component is in an operating system state.

In one embodiment the computing system can include a first controller to provide system state information. A second controller can receive the system state information and can be programmed to control the state of a component. The state of the component can be based on information programmed in the second controller and the system state information. For example the information in the second controller may indicate the state of the component if the system is in a specific power state. The component can include an off state and an operating state controlled by a signal from the second controller.

With reference to the figures, FIG. 1 is a block diagram according to an exemplary embodiment of the invention. A computing system 100 can include a first controller 105 that can be connected to a second controller 110. The first controller 105 may include system state information or may access system state information. For example, if the computing system includes APCI, the operating system and APCI can communicate to generate the system state information. The system state information can be stored in tables, for example. The system state information generated from the tables can be communicated to the second controller 110. The second controller 110 can control the component power state independent of the system power state. For example, if the computing system is in a sleep state the second controller 110 may determine the state of the component based on information in the second controller 110 that may have been programmed prior to the system entering the sleep state such as information received from the computer BIOS; or may be information such as diagnostics performed by the second controller 110 after the computing system entered a sleep state.

The information in the second controller 110 may include a bit that determines the state of the component. For example, if a bit is set the control logic in the second controller 110 can include a driver that can drive the output signal 130 to shutdown input 126 to transition the component 120 to an off state from an operating state if the computing system 110 transitions to a sleep state. The bit may be battery-backed so that after an event where external power was interrupted, the computing system may reinitialize to the state of the power state bit prior to the external power loss. External power can be, for example, alternating current from a wall outlet.

Figure 2:
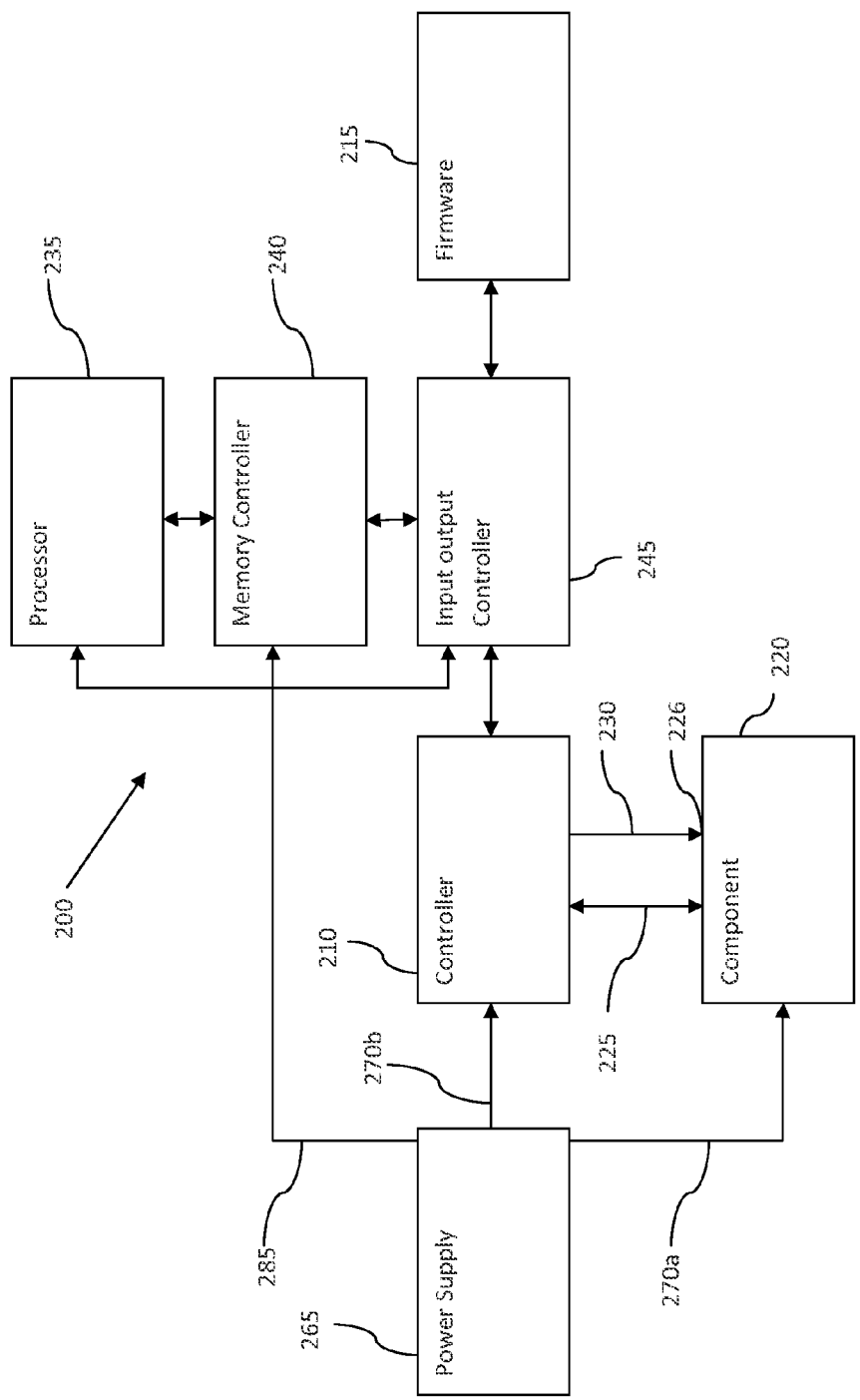
FIG. 2 is a block diagram according to an exemplary embodiment of the invention.

FIG. 2 is a block diagram according to an exemplary embodiment of the invention. The computing system 200 may include a processor 235 that can execute instructions. The instructions can be firmware 215, for example the BIOS of the computing system 200 or may be the OS. The processor can be connected to a memory controller 240 that is connected to an input output controller 245 in one embodiment. The input output controller 245 can be connected to a controller 210. The input output controller 245 can communicate to the controller 210 the system state and the power state bit. The bit state may be determined by the firmware instructions 215 in one embodiment.

The OS can receive information about the power management features that a component supports. The OS can receive from the BIOS information that describes every component handled by ACPI. This description may include the following information, a description of the power resources (power planes and clock sources) the component uses in each power state that the component supports. For example, a component may use a powered bus in the operating state but does not use a powered bus in the off state. In addition to describing the components handled by ACPI, a table can list the power wells and clock sources themselves and the control methods for turning them on and off.

In one embodiment, the OS can track the state of all components on a power bus, and can put the bus in a power state based on the current component requirements on that bus. For example, if all components on a bus are in an off state, the OS can send a command to remove power from the bus to put the bus in the off state. If a particular bus supports a low-power supply state, the OS puts the bus in that state if all components are in the off state where the component may draw less power than in an operating state. The OS may be able issue a set power state command to resume the component. If the computing system is in a sleep state, the OS may not be in control of a component because the processor is in an off state and does not execute code for the OS.

If the computing system goes into a sleep system state, the controller 210 can use that information and the power state bit to send a signal 230 to the component 220 through the shutdown input 226. In one embodiment the power supply 265 may output power to a main power well 285 and to an auxiliary power well 270a and 270b. In one embodiment, the auxiliary power well 270b can power the controller 210 while the main power well 285 is not powered. The main power well may not be powered by the power supply 265 if the computing system is in a sleep system state. A component can be powered if the computing system is in a sleep system state and the main power well is powered off if the component is powered by the auxiliary power well. In one embodiment, a component can be on an auxiliary power well if the component may cause the computing system to transition to an operating state from a sleep state if the component is to transition from an off state to a operational state and the component is on a power well that is not powered in a system sleep state. In one embodiment, the component is supplied power by the auxiliary power well 270a. The component 220 can include a shutdown input 226 to receive a shutdown signal 230 from the controller 210 that can control the power state of the component. If the controller determines that a function that is performed by the component 220 is to be performed, the controller 210 can put to component 220 in an operating state and send data to the component 220 through connection 225.

Figure 3:
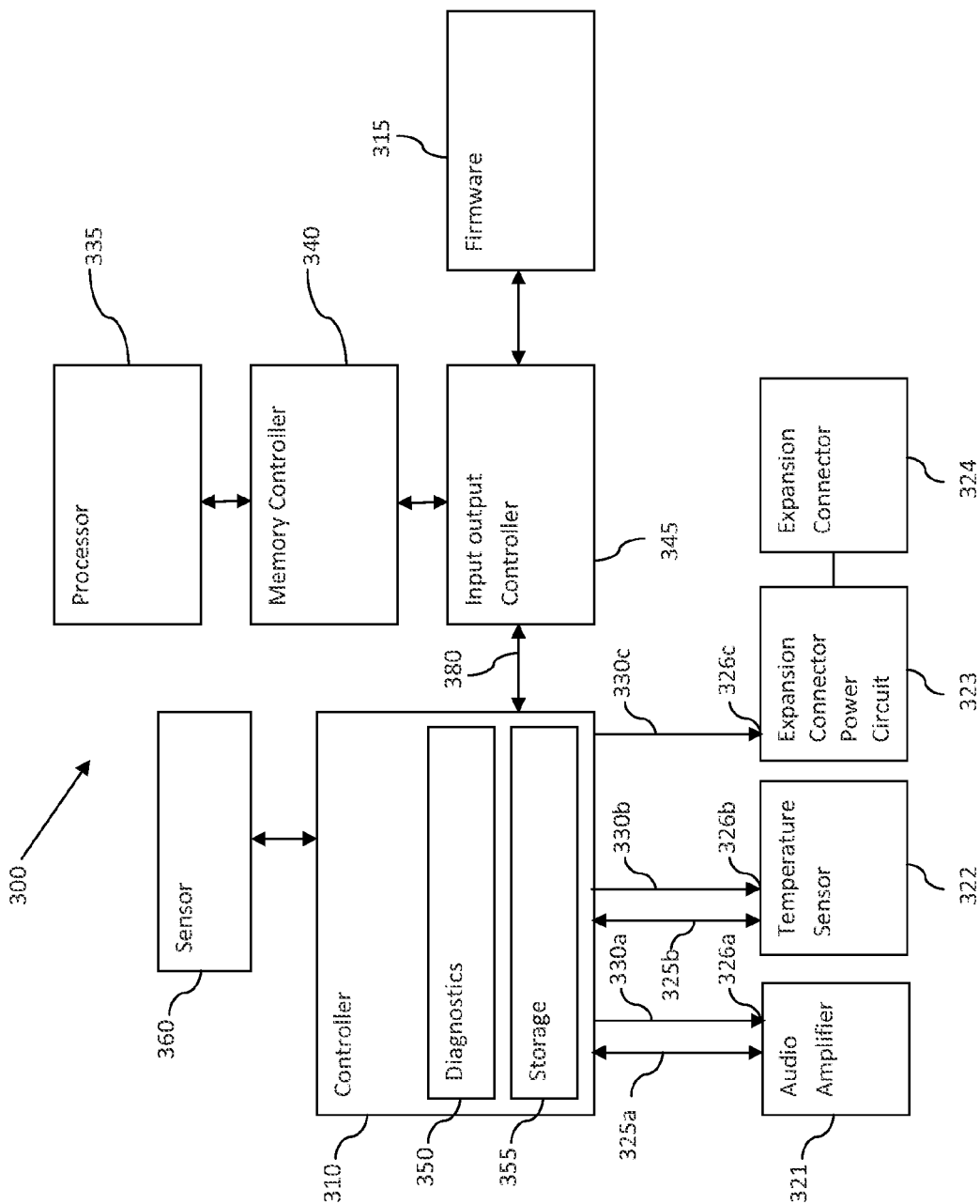
FIG. 3 is a block diagram according to an exemplary embodiment of the invention.

FIG. 3 is a block diagram according to an exemplary embodiment of the invention. A computing system 300 can include a controller 310 to control the audio amplifier power state via the shutdown input 326a on the audio amplifier 321 from a power control signal 330a. The controller 310 can monitor system sleep state control signals 380 and diagnostic 350 to determine how to control the shutdown input 326a on the audio amplifier 321. The sensor 360 may determine, for example, if the processor is missing, if an incorrect voltage condition occurs, if the processor overheats, or other diagnostic error conditions. In addition, the controller 310 can have a sleep bit programmed by firmware 315 to determine if the audio amplifier 321 may be shutdown during system sleep states. The firmware can be, for example, the basic input output system (BIOS) of the computing system that contains code executed by the processor 335 that can be connected to the firmware 315 through a memory controller 340 and input output controller 345. The controller 310 can include an output signal 330a to drive the audio amplifier shutdown input 326a. The controller 310 can drive the output signal to shutdown the audio amplifier 321 if the computing system transitions to a sleep state and if the sleep bit is set. If the computing system exits the sleep state or an error condition occurs, the audio amplifier 321 can be brought out of the shutdown state. The controller 310 can exist as a microcontroller which is programmed or it could exist as dedicated hardware. The controller 310 may for example reside in a super input output controller that is connected to the input output controller 345.

In one embodiment, the audio amplifier 321 may receive signals from the controller 310 to indicate diagnostic events. The audio amplifier 321 may also receive a signal and generate audio to the speakers from the system such as music, video or games. The signal from the system may be from the controller 310 through connection 325a, the input output controller 345, or another source.

In a sleep state a component can retain power through an auxiliary power well. If a component is powered by the auxiliary power well, diagnostics may be performed to determine if the component is operating correctly and to prevent damage to other components that may not be powered on. If the audio amplifier cannot be controlled independent of the system state then the audio amplifier may have to be powered on in a sleep system state to indicate that the diagnostics determined that there is an issue with the computing system. The audio amplifier may indicate the result of a diagnostic by a sound such as a beep from a speaker connected to the audio amplifier. The controller may cause the frequency of a beep to change or may cause the audio amplifier to output a pattern of beeps to the speaker, for example. A different frequency or pattern to the beeps may indicate different diagnostic conditions, for example.

In one embodiment the result of a diagnostic may be indicated by a visual indicator such as a light emitting diode (LED). The LED may be controlled by the controller 310 to generate light. A different pattern or color of the LED may, for example, indicate a different diagnostic condition.

The controller 310 can in one embodiment program a temperature monitoring component 322. The controller 310 may be capable of storing configuration data and programming a component such as a temperature monitoring component. The controller 310 can determine to store configuration information for the temperature monitoring component depending on the sleep bit for the temperature monitoring component. For example the controller 310 may not store the configuration information if the sleep bit indicates that the temperature monitoring component is to remain powered in the computing system sleep state but may store the configuration information if the sleep bit indicates that the temperature monitoring component is powered off in the computing system sleep state. The controller 310 can use storage 355 to store the temperature monitor component configuration information. The storage 355 may be, for example, registers. The registers may reside in an auxiliary power well so that they retain their data through sleep state transitions. The register structure can be organized into address and data information of the configuration space of the temperature monitoring component. A register may store system management bus (SMBus) component specific information such as the SMBus component address and protocol parameter settings. The controller 310 may store the number of address and data pairs to be used to configure a component such as the temperature monitoring component. The controller 310 can access the information in the storage registers and form SMBus transactions to program the temperature monitoring component.

The temperature monitoring component may include an interface to the SMBus or may include an interface to another bus type. The SMBus interface can allow the controller 310 to communicate with the temperature monitoring component 322 through connection 325b. If the controller 310 stores the configuration information for the temperature monitoring component 322, the temperature monitoring component 322 can be powered by a main well which is powered down during system sleep states. If the temperature monitoring component 322 is powered by the auxiliary power well, the shutdown signal 330b can control the shut down input 326b to put the temperature monitoring component 322 in an off state if the temperature monitoring component 322 is supplied power.

In one embodiment, the first time the computing system is booted, the BIOS can program the registers in controller 310. The BIOS can provide the controller 310 with the configuration information that is used by the temperature monitoring component 322. If a transition occurs after the first time the computing system is booted the controller 310 can automatically configure the temperature monitoring component 322 after main power well has returned.

The BIOS may be able to determine the system states for which the controller 310 restores the configuration of the temperature monitoring component 322 in one embodiment. If a failure occurs during the time the controller 310 is configuring the temperature monitoring component 322, the controller can recognize the failing condition and respond appropriately. A failure may be a bus error on the digital communication interface, a component error where the temperature monitor component 322 fails to respond, or any type of communication error.

In one embodiment, the controller 310 can control auxiliary power to an expansion connector 324 of a computing system 300. A component can be in one embodiment power control circuitry 323 for an expansion connector 324. The controller 310 can monitor system sleep state control signals from the controller 345 and a bit to determine if auxiliary power for the expansion connector 324 is transitioned to an off state if the system is transitioned to the sleep system state.

The controller 310 can also include an output signal 330c to control the circuitry that applies auxiliary power to the expansion connectors. The component 323 can receive at input 326c the output signal 330c that can be a shutdown signal. If the component 323 receives the shutdown signal the component 323 ceases to supply power to the expansion connectors 324. The expansion connector can be for example a PCI, PCIe, USB, or another expansion connector.

Figure 4:
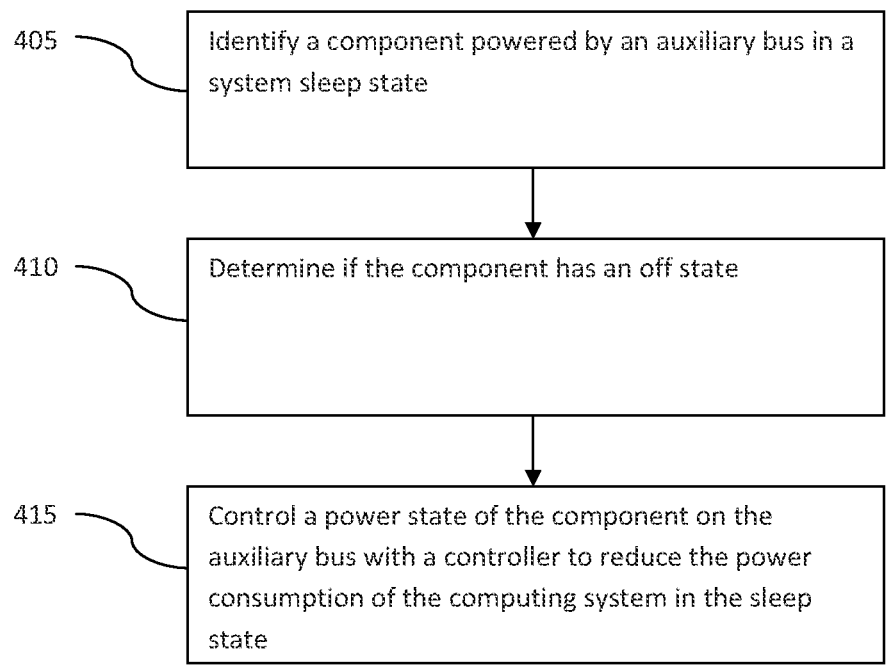
FIG. 4 is a flow diagram according to an exemplary embodiment of a method of the invention.

FIG. 4 is a flow diagram according to an exemplary embodiment of a method of the invention. An embodiment of the method begins by identifying a component powered by an auxiliary bus in a system sleep state (at 405). If a component is powered by an auxiliary bus in a system sleep state, it is determined if the component has an off state (at 410). A power state of the component on the auxiliary bus can be controlled with a controller to reduce the power consumption of the computing system in the sleep state (at 415).

The shutdown signal to the component can be from a controller. The controller can use state information and bit information that may be stored in the controller to identify if the component can be powered off. If the component can be powered off the controller can send a shutdown signal to the shutdown input of the component. In one embodiment the BIOS can program the bit in the controller to control the shut down signal.

In one embodiment, the controller can perform diagnostics on the computing system and control the shut down signal to power up the component based on the diagnostic result. To power up the component, the controller can control the shutdown signal. The controller may monitor sensors as part of the diagnostics. If the sensors that are monitored by the controller indicate that there may be an issue with the computing system the controller may power up the component to indicate a diagnostic condition.

In one embodiment the BIOS provides configuration information for the component and if the component is shut off, the configuration information can be supplied by the BIOS that can be accessed in a transition from a sleep system state to an operating system state. In one embodiment the controller can store configuration information of the component after it is programmed by the BIOS. If the controller stores the configuration information of the component, the component can be shutdown and powered up without changing the system state from a sleep system state to an operating state. If the controller provides a signal to the component to power up, the controller can configure the component using the configuration information stored on the controller without waiting for the BIOS to configure the component.

The techniques described above may be embodied in a computer-readable medium for configuring a computing device to execute the method. The computer readable media may include, for example and without limitation, any number of the following: magnetic storage device media including disk and tape storage device media; optical storage device media such as compact disk media (e.g., CD-ROM, CD-R, etc.) and digital video disk storage device media; holographic memory; nonvolatile memory storage device media including semiconductor-based memory units such as FLASH memory, EEPROM, EPROM, ROM; ferromagnetic digital memories; volatile storage device media including registers, buffers or caches, main memory, RAM, etc. Other new and various types of computer-readable media may be used to store and/or transmit the software modules discussed herein. Computing devices may be found in many forms including but not limited to mainframes, minicomputers, servers, workstations, personal computers, notepads, personal digital assistants, various wireless devices and embedded systems, just to name a few.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A computing system comprising:
   an audio amplifier; and
   a controller to control a power state of the audio amplifier based on diagnostic information of the computing system and power state information of the computing system;
   wherein the audio amplifier includes an off state and an operating state independent of whether the computing system is in a sleep state and indicated by a signal from the controller;
   wherein the controller is to monitor diagnostics of the computing system during the sleep state and with the audio amplifier in the off state; and
   wherein, while the computing system remains in the sleep state, based upon detecting a diagnostic error condition, the controller is to (i) transition the audio amplifier from the off state to the operating state, and (ii) send a signal to the audio amplifier to cause an audio indication of the detected diagnostic error condition.

2. The system of claim 1, further comprising a basic input output system (BIOS) to program a bit stored by the controller, wherein the bit indicates the state of the audio amplifier when the computing system is in the sleep state.

3. The system of claim 2, wherein if the bit is in a first state the audio amplifier is in the operating state and if the bit is in a second state the audio amplifier is in the off state.

4. The system of claim 1, wherein the controller includes a driver to indicate to the audio amplifier a shutdown signal.

5. The system of claim 1, further comprising a storage on the controller to store configuration information for the audio amplifier.

6. The system of claim 5, wherein the controller is to read configuration information from the storage and program the audio amplifier with the configuration information if a bit indicates a transition from a first power state to a second power state.

7. The system of claim 1 wherein the detected diagnostic error condition includes at least one of a missing processor, an incorrect voltage condition, and an overheating condition.

8. A non-transitory computer readable medium comprising instructions that, when executed by a controller of a computing system, cause the controller to:
   control a power state of an audio amplifier on an auxiliary bus to reduce power consumption of the computing system in a sleep state;
   perform diagnostics on the computing system in the sleep state and with the audio amplifier in an off state; and
   based on detection of a diagnostic result while the computing system is in the sleep state, (i) transition the audio amplifier from the off state to an operating state, and (ii) provide a signal to the audio amplifier to indicate a diagnostic condition of the computing system.

9. The non-transitory computer readable medium of claim 8, wherein the executed instructions further cause the controller to store configuration information of the audio amplifier in a storage of the controller.

10. The non-transitory computer readable medium of claim 8, wherein the executed instructions further cause the controller to program a bit to transmit a shutdown signal transmitted to the audio amplifier.

11. A computing system, comprising:
    an alert indicator, wherein the alert indicator includes an audio amplifier; and
    a controller to monitor diagnostics of the computing system during a sleep state;
    wherein, while the computing system remains in the sleep state, based upon detecting a diagnostic error condition, the controller is to send a signal to the alert indicator to cause the alert indicator to indicate the diagnostic error condition;
    wherein the controller is to control a power state of the audio amplifier, and wherein the audio amplifier is to include an off state and an operating state independent of whether the computing system is in the sleep state and indicated by a signal from the controller;
    wherein the controller is to monitor diagnostics of the computing system during the sleep state and with the audio amplifier in the off state; and
    wherein, while the computing system remains in the sleep state, based upon detecting the diagnostic error condition, the controller is to (i) transition the audio amplifier from the off state to the operating state, and (ii) send signal to the audio amplifier to cause an audio indication of the detected diagnostic error condition.

12. The computing system of claim 11, wherein the alert indicator includes a visual indicator.

13. The computing system of claim 12, wherein the controller causes the visual indicator to indicate the diagnostic error condition by visually generating a pattern unique to the error condition.

* * * * *